(12) United States Patent
Rivalsi et al.

(10) Patent No.: US 7,412,610 B2
(45) Date of Patent: Aug. 12, 2008

(54) SYSTEM AND METHOD FOR POWER DELIVERY TO COMPUTING TERMINALS

(75) Inventors: Kenneth Rivalsi, Lake Grove, NY (US); Christopher R. Paul, Bayport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 383 days.

(21) Appl. No.: 11/131,811

(22) Filed: May 18, 2005

(65) Prior Publication Data

US 2006/0265606 A1 Nov. 23, 2006

(51) Int. Cl.
*G06F 1/26* (2006.01)
(52) U.S. Cl. ..................... 713/300; 379/412
(58) Field of Classification Search .............. 713/300; 379/412
See application file for complete search history.

(56) References Cited

U.S. PATENT DOCUMENTS

| | | | | |
|---|---|---|---|---|
| 4,999,728 A | * | 3/1991 | Curl | ............... 361/33 |
| 5,319,514 A | * | 6/1994 | Walsh et al. | ............... 361/59 |
| 5,592,353 A | * | 1/1997 | Shinohara et al. | ............. 361/63 |
| 5,987,569 A | | 11/1999 | Takahashi et al. | |
| 6,067,628 A | | 5/2000 | Krithivas et al. | |
| 6,204,650 B1 | | 3/2001 | Shimamori | |
| 6,885,745 B1 | * | 4/2005 | Handforth et al. | ............ 379/412 |
| 2004/0148060 A1 | * | 7/2004 | Lee | ............... 700/295 |
| 2005/0280969 A1 | * | 12/2005 | Reynolds | .................. 361/93.1 |

* cited by examiner

*Primary Examiner*—Thomas Lee
*Assistant Examiner*—Vincent T Tran
(74) *Attorney, Agent, or Firm*—Fay Kaplun & Marcin, LLP

(57) ABSTRACT

Described is a method wherein a computer terminal is coupled to a power supply through a docking arrangement. The docking arrangement includes a protection circuit. A current supplied to the computing terminal is detected. When the current is greater than a predetermined value, the computer terminal is decoupled from the power supply. After the computer terminal is decoupled from the power supply, the computer terminal is recoupled to the power supply, and the method repeats beginning with detecting the current supplied to the computing terminal.

23 Claims, 4 Drawing Sheets

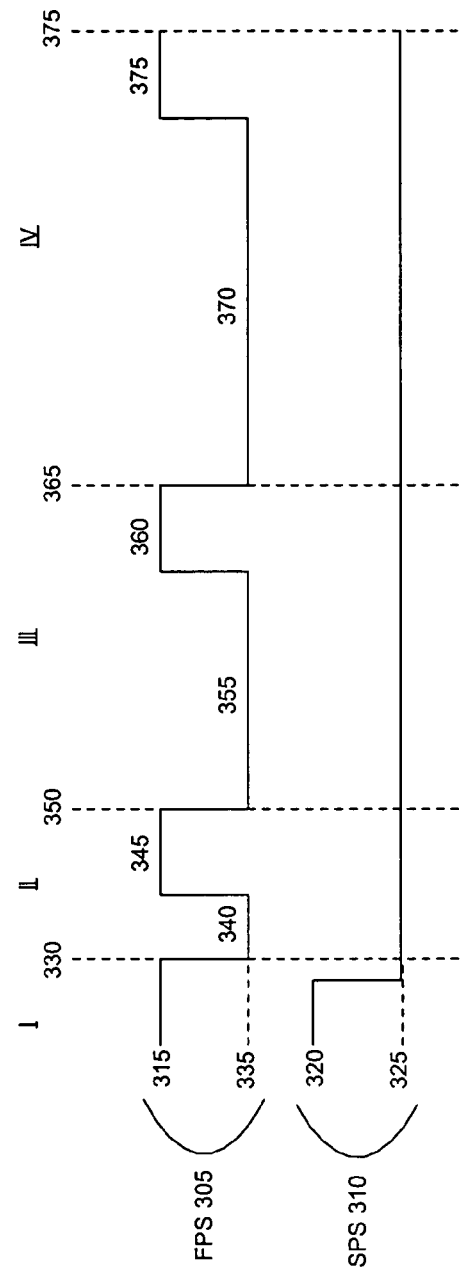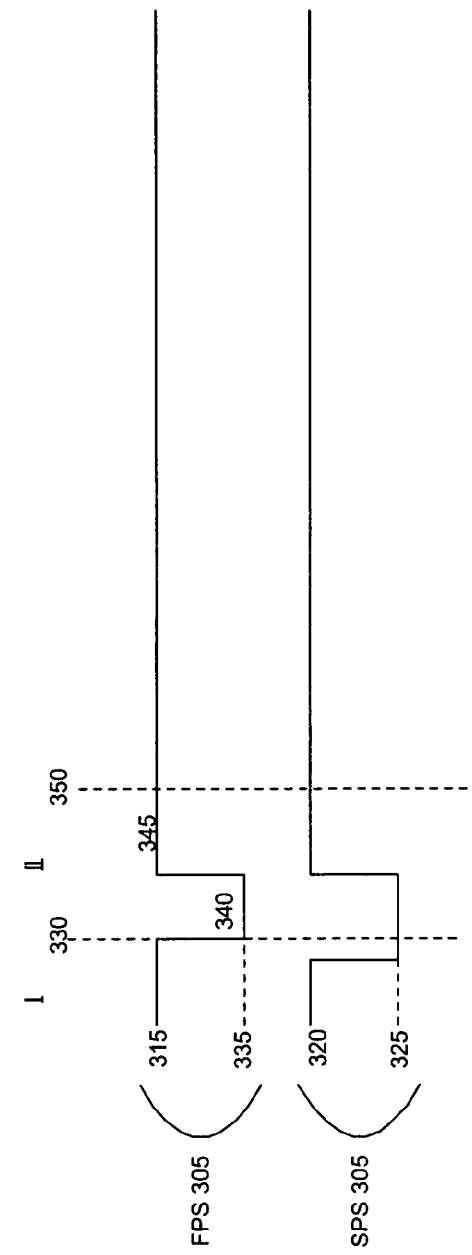

SYSTEM AND METHOD FOR POWER DELIVERY TO COMPUTING TERMINALS

BACKGROUND

In a conventional computing network, a plurality of components may be coupled to a common device for power management and/or data transfer. For example, the common device may be a cradle which receives one or more mobile computing terminals. Upon connection to the cradle, the terminal may receive power therefrom (e.g., charge a battery) and communicate with a network device (e.g., a server) coupled thereto. However, upon connection or during operation, one or more of the terminals may experience a short circuit causing the remaining terminals and/or the cradle to malfunction. The short circuit results in delivery of an excessive amount of power to the shorted terminal, inhibiting operation of the remaining terminals. Also, the excessive amount of energy may generate a great deal of heat, potentially resulting in a fire or an explosion.

A conventional method of protecting against the short circuit involves terminating power delivery to each of the terminals once the short circuit is detected. For example, when a terminal short circuits, the cradle will terminate power delivery to all of the terminals connected thereto. This may interrupt operation (e.g., data transfer, charging) of the terminals which did not short circuit. A user must manually reset the cradle and correct the short circuit to reestablish power delivery to the terminals. Thus, there is a need for a system which may experience the short circuit without interrupting operation of the terminals and does not require user intervention.

SUMMARY OF THE INVENTION

The present invention relates to a method wherein a computer terminal is coupled to a power supply through a docking arrangement. The docking arrangement includes a protection circuit. A current supplied to the computing terminal is detected. When the current is greater than a predetermined value, the computer terminal is decoupled from the power supply. After the computer terminal is decoupled from the power supply, the computer terminal is recoupled to the power supply, and the method repeats beginning with detecting the current supplied to the computing terminal.

BRIEF DESCRIPTION OF DRAWINGS

FIG. 3a shows an exemplary embodiment of a timing diagram according to the present invention;

FIG. 3b shows another exemplary embodiment of a timing diagram according to the present invention.

DETAILED DESCRIPTION

Figure 1:
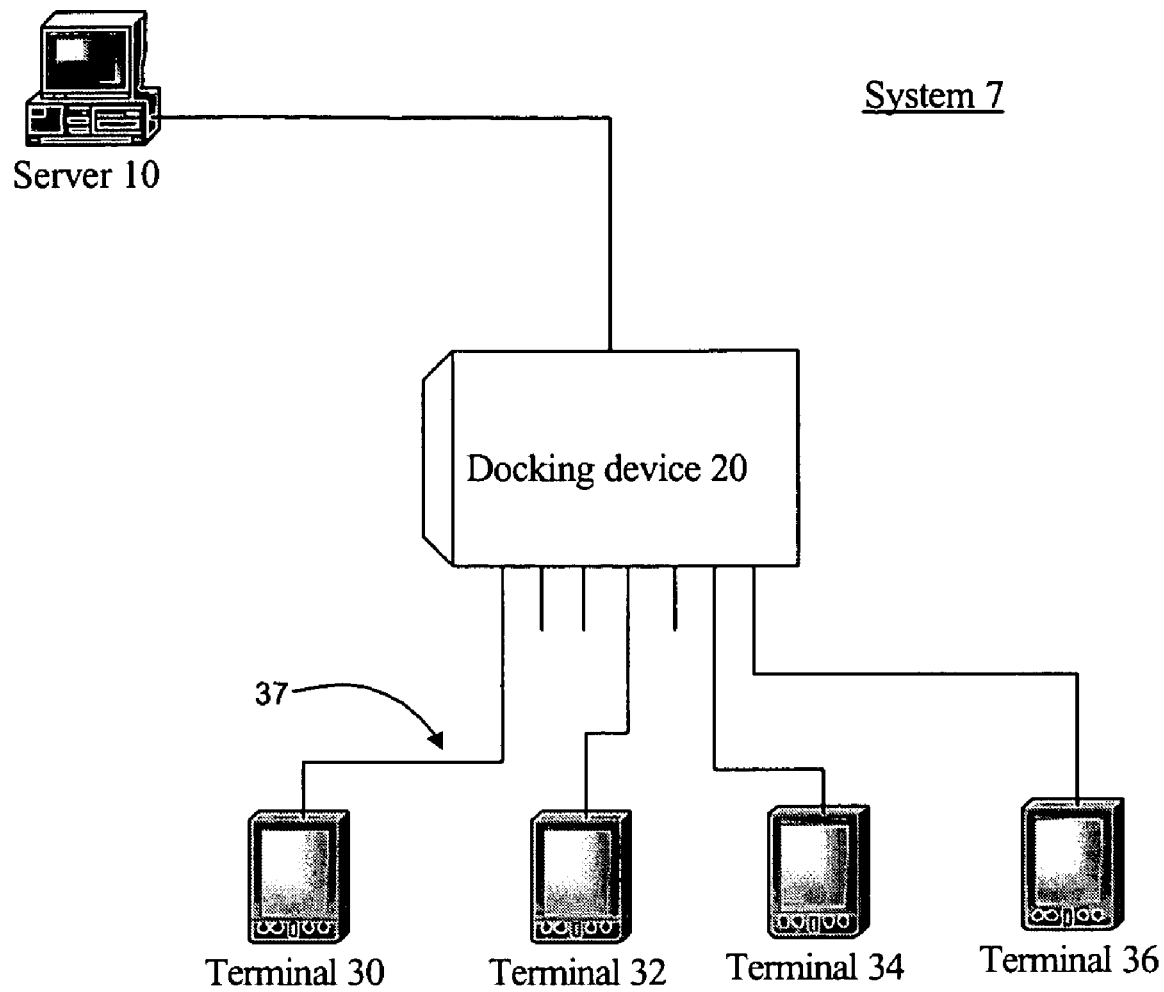
FIG. 1 shows an exemplary embodiment of a system according to the present invention.

The present invention may be further understood with reference to the following description and the appended drawings, wherein like elements are provided with the same reference numerals. Although the present invention will be discussed with reference to a computing network, it should be understood that the present invention may be applied to any system which includes a plurality of devices sharing a common power source.

FIG. 1 shows an exemplary embodiment of a system 7 according to the present invention. The system 7 may include a network computing device (e.g., a server 10) coupled to a docking device 20 (e.g., a cradle) which receives one or more wireless computing terminals 30, 32, 34, 36. Although, the network computing device is shown as the server 10, those of skill in the art will understand that the system 7 may, alternatively or additionally, include one or more further computing devices coupled to the docking device 20. For example, the further computing device may include, but is not limited to, a personal computer, an access point, a switch, etc. In this manner, the docking device 20 may be coupled to and access a communications network (e.g., LAN, WAN, WLAN, WWAN, etc.).

The server 10 may communicate with the docking device 20 via a wired or wireless connection therebetween. In one embodiment, the server 10 is coupled directly to the docking device 20. In another embodiment, the server 10 communicates with the docking device 20 via the communications network and any devices therein (e.g, switches, routers, hubs, etc.). The server 10 may be coupled to a database which may be accessed by the docking device 20 and/or the terminals 30-36. For example, the terminals 30-36 may synchronize with the server 10 and each other by communicating with via the docking device 20. Also, the server 10 may access data stored in the docking device 20 and/or the terminals 30-36, and vice-versa.

Figure 2:
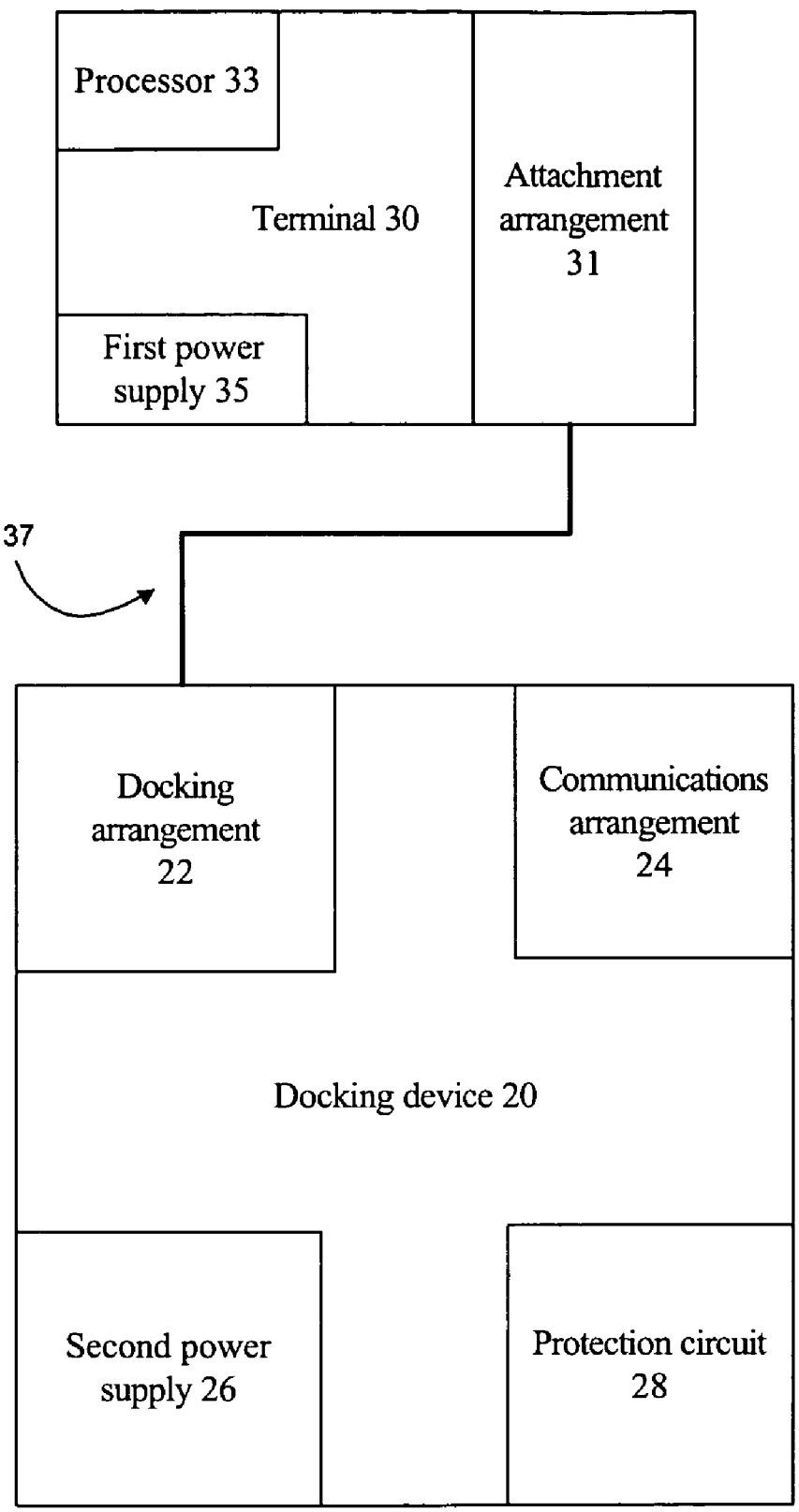
FIG. 2 shows an exemplary embodiment of a docking device and a terminal according to the present invention.

FIG. 2 shows an exemplary embodiment of the docking device 20 and the terminal 30. Those skilled in the art will understand that the terminals 32-36, along with any further terminals, may contain substantially similar architectures to that of the terminal 30. The terminal 30 may be any computing device which can be coupled to the docking device 20. For example, the terminal 30 may be, but is not limited to, a portable barcode scanner, a PDA, a cell phone, a laptop, etc.

The terminal 30 includes a processor 33 which controls operation thereof. The processor 33 may function as a conventional processor/controller by accessing instructions/data stored on a memory of the terminal 30. The processor 33 and other components of the terminal 30 receive power from a first power supply 35. In one embodiment, the first power supply 35 is a battery which may be rechargeable or replaceable. For example, when the terminal 30 is coupled to the docking device 20, the terminal 30 may operate using power derived from the docking device and, optionally, recharge the battery. When not coupled to the docking device 20, the terminal 30 derives power therefrom (e.g., discharges the battery).

According to the present invention, the terminal 30 further includes an attachment arrangement 31 for coupling to the docking device 20. In one embodiment, the attachment arrangement 31 is a port which receives a cable 37 (e.g., USB, serial, Ethernet, etc.) that is further connected to the docking device 20. In another embodiment, the attachment arrangement 31 is one or more electrical leads which may directly contact corresponding leads on the docking device 20. In any embodiment, the attachment arrangement 31 allows the terminal 30 to communicate with the docking device 20. That is, power (e.g., current) and/or data signals may be transmitted from and received by the terminal 30 using the attachment arrangement 31. Thus, the terminal 30 may communicate with the server 10 when coupled to the docking device 20.

As shown in FIG. 2, the docking device 20 may include a docking arrangement 22, a communications arrangement 24, a second power supply 26, and a protection circuit 28. In one embodiment, the docking arrangement 22 is a further port which receives the cable 37 connected to the attachment arrangement 31 of the terminal 30. In another embodiment, the docking arrangement 22 is the corresponding leads which engage the electrical leads of the terminal 30. As understood by those of skill in the art, the docking device 20 may include a predetermined number of docking arrangements 22 for receiving one or more terminals 30 and/or further electrical devices. Thus, the docking arrangements may be the same as the docking arrangement 22 (e.g., receive the same cable 37) or may vary from one to the other. For example, in the embodiment shown in FIG. 1, the docking device 20 would include at least four docking arrangements 22. In any embodiment, the docking arrangement 22 may further include an indicator (e.g., a light emitting diode ("LED"), a speaker, etc.) which represents that the terminal 30 has been coupled thereto. Further, the docking arrangement 22 may include one or more terminal housings for holding each of the terminals 30-36 when coupled to the docking device 20.

The communications arrangement 24 of the docking device 20 may be a hardware port (e.g., USB, serial, Ethernet, etc.) which provides for a connection to the server 10 and/or any device in the communications network. In another embodiment, the communication arrangement 24 is a transceiver which provides a wireless connection to the server 10 or the communications network. In a further embodiment, the docking device 20 may not include the communications arrangement 24, but acts simply as a charger for the power supply 35 of the terminal 40.

The docking device 20 may further include the second power supply 26 may be a conventional power source (e.g., a battery) which supplies power to the components of the docking device 20 and, optionally, the terminals 30-36 coupled to the docking device 20. As understood by those of skill in the art, the second power supply 26 may be the battery which is rechargeable and/or replaceable. In another embodiment, the second power supply 26 may be an AC/DC adapter for connection to a conventional power source (e.g., a line voltage). In this embodiment, the docking device 20 may derive power from the power outlet when coupled thereto, but may derive power from the battery when not coupled to the power outlet. Furthermore, when the docking device 20 is coupled to the power outlet, the second power supply 26 may be charged. As described above, the terminal 30 is coupled to the docking device 20, the terminal 30 may derive power from the second power supply 26.

According to the present invention, the docking device 20 further includes the protection circuit 28 which may include, for example, a microprocessor, one or more integrated circuits, a memory, a voltage and/or current sensor, etc. Alternatively, the protection circuit 28 may be implemented as one or more software modules. The protection circuit 28 monitors the connection, and in particular, the transfer of power (e.g., current and/or voltage) between the docking device 20 and the terminal 30, which will be described below. The protection circuit 28 may further monitor a power transfer between the docking device 20 and the server 10. In this manner, the protection circuit 28 may further include a conventional surge protector for preventing power surges between the docking device 20 and the terminal 30, and between the docking device 20 and the server 10. The surge protector may be comprised of, for example, metal oxide varistors ("MOVs") and gas discharge arrestors.

FIG. 3a shows an exemplary embodiment of a timing diagram of a power control process 300 according to the present invention. In the process 300, the protection circuit 28 of the docking device 20 monitors a first power signal ("FPS") 305 and a second power signal ("SPS") 310. The FPS 305 may represent an "ENABLE" signal to a power generation circuit. The signal is either a request that power continue to be generated (e.g., a solid HIGH) or that the power generation circuit retry initiating a generation of power (e.g., a TRANSITION from LOW to HIGH). The SPS 310 may represent a feedback signal indicating whether power is successfully applied to the terminal 30.

In Phase I, the FPS 305 is at a first value 315 indicating that power is being supplied to the terminal 30. As described above, the power may be supplied to the terminal 30 via the docking arrangement 22 upon coupling of the terminal 30 to the docking device 20, while the terminal 30 is coupled to the docking device 20, or at any time which the terminal 30 is deriving power from (or communicating with) the docking device 20. During the Phase I, the terminal 30 is in a first state (e.g., normal operation—data transfer, charging, etc.) and consuming power from the docking device 20 at a second value 320. Thus, while the SPS 310 remains at the second value 320, the protection circuit 28 recognizes that the terminal 30 is in the first state. Also, as shown in Phase I, the SPS 310 changes (e.g., drops) to a third value 325 which may indicate that the terminal 30 is in a second state (e.g., has short circuited). When in the second state, the terminal 30 may draw an excessive amount of current from the docking device 20, and, as a result, the remaining terminals 32-36 coupled to thereto may lose power inhibiting present (e.g., data transfer) and future operation (e.g., takes longer to charge, may not be ready for use).

At a first predefined time (e.g., a first checkpoint 330), the protection circuit 28 assesses the SPS 310. As shown in FIG. 3a, at the first checkpoint 330, the SPS 310 remains at the third value 325 indicating that the terminal 30 is in the second state. In response to detection of the third value 325, the protection circuit 28 terminates the delivery of power to the terminal 30. As shown in Phase II, which begins after the first checkpoint 330, the protection circuit 28 changes the FPS 305 to a fourth value 335 (e.g., zero). In this manner, the terminal 30 may no longer draw power from the docking device 20. Thus, the remaining terminals 32-36 coupled to the docking device 20 may continue operation(s) and drawing power therefrom.

As further seen in Phase II, after the first checkpoint 330, the protection circuit 28 maintains the FPS 305 at the fourth value 335 for a first duration 340 (e.g., 100 ms). In this manner, power is not being supplied to the terminal 30 for the first duration 340. After expiration of the first duration 340, the protection circuit 28 may change the FPS 305 back to the first value 315 for a second duration 345 (e.g., 200 ms). Thus, the protection circuit 28 is again supplying power to the terminal 30.

At a second predefined time (e.g., a second checkpoint 350) during or at an expiration of the second duration 345, the protection circuit 28 reassesses the SPS 310. As shown in FIG. 3a, at the second checkpoint 350, the SPS 310 remains at the third value 325 indicating that the terminal 30 is in the second state. Upon detecting the third value 325, the protection circuit 28 returns the FPS 305 to the fourth value 335 for a third duration (e.g., 600 ms) 355, as shown in Phase III.

In Phase III, the third duration 355 is longer than the first duration 340, because the terminal 30 has not returned to the first state. Thus, the protection circuit 28 provides more time for the terminal 30 to return to the first state. After the third duration 355 has expired, the protection circuit 28 returns the FPS 305 to the first value 315 for a fourth duration 360 (e.g., 200 ms), supplying power to the terminal 30.

At a third predefined time (e.g., a third checkpoint 365) during or at an expiration of the fourth duration 360, the protection circuit 28 reassesses the SPS 310. As shown in FIG. 3*a*, at the third checkpoint 365, the SPS 310 remains at the third value 325 indicating that it remains in the second state. Upon detecting the third value 325, the protection circuit 28 returns the FPS 305 to the first value 315 for a fifth duration (e.g., 25 s) 370, as shown in Phase IV.

In Phase IV, the fifth duration 370 is longer than the third duration 355, because the protection circuit 28 is providing more time for the terminal 30 to return to the first state. After the fifth duration 370 has expired, the protection circuit 28 returns the FPS 305 to the first value 315 for a sixth duration 375 (e.g., 200 ms), supplying power to the terminal 30.

At a fourth predefined time (e.g., a fourth checkpoint 375) during or at an expiration of the sixth duration 375, the protection circuit 28 reassesses the SPS 310. As shown in FIG. 3*a*, at the fourth checkpoint 375, the SPS 310 remains at the third value 325 in the second state. If the terminal 30 has not returned to the first state after the fourth checkpoint 375, the protection circuit 28 may continue with a plurality of further checkpoints and/or provide an indication (e.g., via LED, speaker, message to the server 10, etc.) that the terminal 30 remains in the second state. The indication may represent that the docking device 20 will no longer supply power to the terminal 30 until, for example, the user manually intervenes (e.g., resets the docking device 20).

FIG. 3*b* shows another exemplary embodiment of the timing diagram according to the present invention. In FIG. 3*b*, at the first checkpoint 330, the protection circuit 28 detects the third value 325 of the SPS 310 and determines that the terminal 30 is in the second-state. In response, the protection circuit 28 performs the actions described above with respect to Phase II. At the second checkpoint 350, the protection circuit 28 reassesses the SPS 310 and detects the second value 320 indicating that the terminal 30 has returned to the first state. Thus, the protection circuit 28 may maintain the FPS 305 at the first value 315 while continually reassessing the SPS 310 at predetermined intervals (e.g., every 100 ms). If, during one of the predetermined intervals the protection circuit 28 detects that the SPS 310 is at the third value 325, the protection circuit 28 may initiate the process 300 described above beginning with Phase II (e.g., changing the FPS 305 to the fourth value 335 for the first duration 340).

As understood by those of skill in the art, various modifications may be made to the power control process 300 described above. For example, each of the durations may be equal to or vary with respect to one another. Also, the process 300 may utilize one or more checkpoints, and is not limited to four. Further, each of the values may be preprogrammed and known by the protection circuit 28 prior to deployment of the docking device 20. Alternatively, the protection circuit 28 may be programmed to recognize a predefined change of the SPS 310 from the second value 320 to the third value 325, and respond with a further predefined change of the FPS 305 from the first value 315 to the fourth value 335. Also, at any time during the process 300, the docking device 20 may provide the indication to the user that the terminal 30 is in the second state. That is, the user may intervene before the process 300 has been completed.

Figure 4:
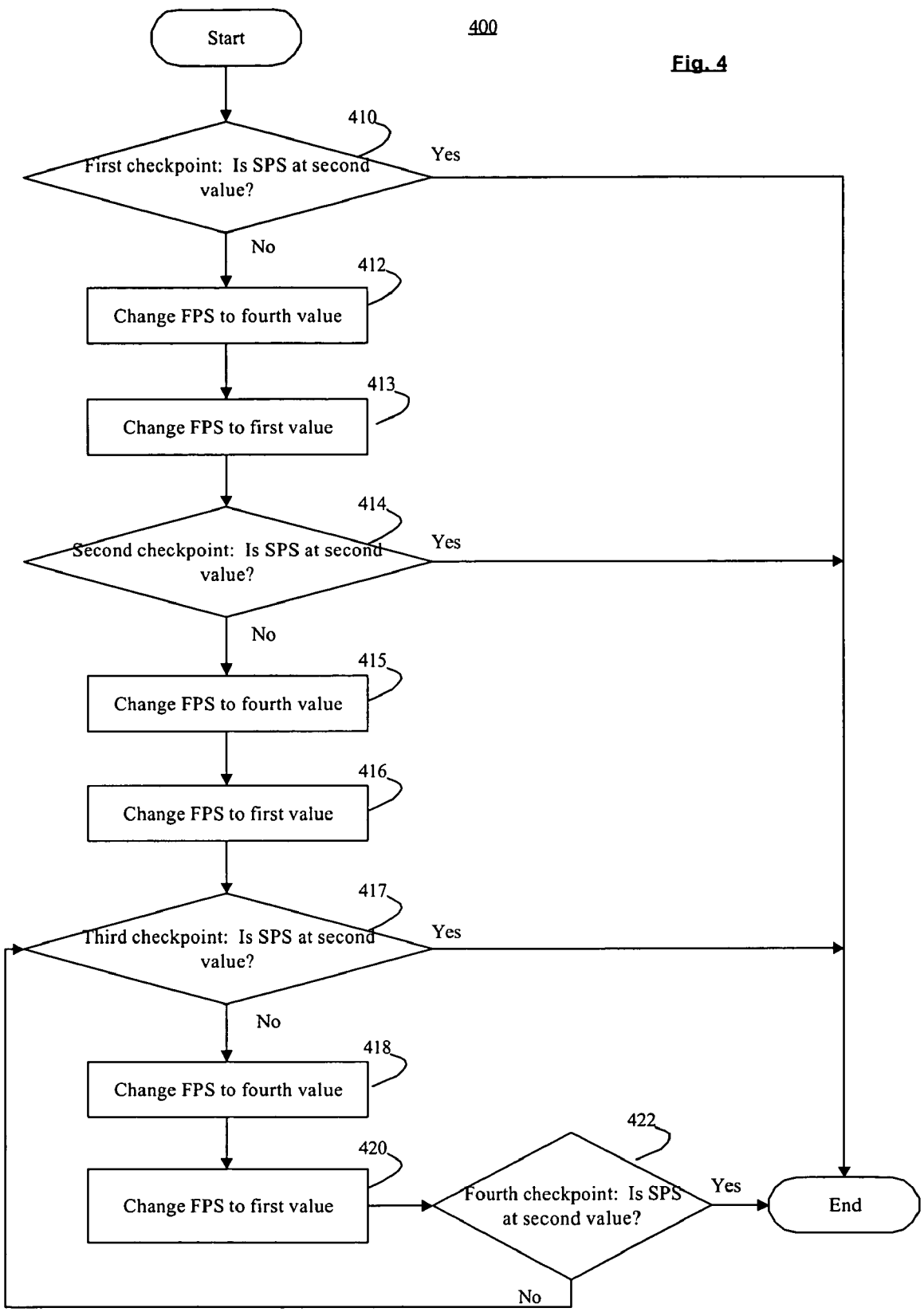
FIG. 4 shows an exemplary embodiment of a method according to the present invention.

FIG. 4 shows an exemplary embodiment of a method 400 according to the present invention. The method 400 may be initiated upon coupling the terminal 30 to the docking device 20 or while the terminal 30 is connected thereto and in operation (e.g., charging, transferring data, etc.). In step 410, the protection circuit 28 initiates the first checkpoint 330 to assess the SPS 310, and, in particular, to determine whether the SPS 310 is at the second value 320. If the terminal is in the first state (e.g., SPS 310 is at the second value 320), the protection circuit 28 may continuously reassess the SPS 310 continuously or after each predetermined interval (e.g., 100 ms), and initiate the first checkpoint 330 upon detecting the predefined change of the SPS 310 from the second value 320 to the third value 325.

In step 412, the SPS 310 is not at the second value 320, so the protection circuit 28 changes the FPS 305 to the fourth value 335, thereby terminating the supply of power to the terminal 30. The fourth value 335 may be zero or a negligible amount which would allow the docking device 20 to continue supplying power to the remaining terminals 32-36 coupled thereto. As described above, the termination of power may be for the first duration 335.

In step 413, the protection circuit 28 changes the FPS 305 to the first value 315, thereby supplying power to the terminal 30. The first value 315 may be any non-zero value which would allow the terminal 30 to operate (e.g. charge, data transfer, etc.) while in the first state. As described above, the FPS 305 may be maintained at the first value 315 for the second duration 345 which may be enough long to allow the terminal 30 to begin operating (e.g., switch to the first state).

In step 414, the protection circuit 28 initiates the second checkpoint 350 to determine whether the SPS 310 is at the second value 320. If the terminal 30 is in the first state, the protection circuit 28 may continuously reassess the SPS 310 after each predetermined interval (e.g., 100 ms). If the SPS 310 is not at the second value 320, the terminal 30 remains in the second state.

In step 415, the SPS 310 is not at the second value 320, so the protection circuit 28 changes the FPS 305 to the fourth value 335, thereby terminating the supply of power to the terminal 30. As described above, the termination of power after the second checkpoint 350 may be for the third duration 335 which may be equal to or longer than the first duration 340.

In step 416, the protection circuit 28 changes the FPS 305 to the first value 315 re-supplying power to the terminal 30. As described above, the FPS 305 may be maintained at the first value 315 for the fourth duration 360. Preferably, the fourth duration 360 is equal to the second duration 345, thereby preventing a drain of the power supplied to the remaining terminals 32-36 coupled to the docking device 20.

In step 417, the protection circuit 28 initiates the third checkpoint 365 to determine whether the SPS 310 is at the second value 320. If the terminal is in the first state, the protection circuit 28 may continuously reassess the SPS 310 after each predetermined interval (e.g., 100 ms). If the SPS 310 is not at the second value 320, the terminal 30 remains in the second state.

In step 418, the SPS 310 is not at the second value 320, so the protection circuit 28 changes the FPS 305 to the fourth value 335, thereby terminating the supply of power to the terminal 30. As described above, the termination of power after the third checkpoint 365 may be for the fifth duration 370 which may be equal to or longer than the third duration 340.

In step 420, the protection circuit 28 changes the FPS 305 to the first value 315 re-supplying power to the terminal 30. As described above, the FPS 305 may be maintained at the first value 315 for the sixth duration 375. Preferably, the sixth duration 375 is equal to the second duration 345 and the fourth duration 360, thereby preventing a drain of the power supplied to the remaining terminals 32-36 coupled to the docking device 20.

In step 422, the protection circuit 28 initiates the fourth checkpoint 375 to determine whether the terminal 30 is in the first state, and in particular, whether the SPS 310 is at the second value 320. If the terminal 30 is in the first state, the protection circuit 28 may continuously reassess the SPS 310 after each predetermined interval (e.g., 100 ms).

If the SPS 310 is not at the second value 320 after the fourth checkpoint 375, the protection circuit 28 may, as shown in FIG. 4, return to the third checkpoint 365 (step 417) for as long as the SPS 310 is not at the second value 320. In another embodiment, the protection circuit 28 may re-initiate the method 400 beginning at the first checkpoint 330 (step 410). In a further embodiment, the protection circuit 28 may provide an indication (e.g., LED, speaker, message to the server 10) to the user that the terminal 30 remains in the second state. In this embodiment, the docking device 20 may not allow the terminal 20 to draw power therefrom until the user manually performs a predefined action (e.g., resets the docking device 20).

Those of skill in the art will understand that several advantages for power delivery to computing terminals are provided by the present invention. For example, the termination of power delivery to a short circuited terminal prevents a build-up of heat generated by the short circuit, which could potentially result in a fire or an explosion. Further, by terminating the power delivery to only the short circuited terminal, the remaining terminals connected to the docking device may continue operation (e.g., data transfer to server/communications network, charging, etc.).

In the preceding specification, the present invention has been described with reference to specific exemplary embodiments thereof. However, it will be evident to those skilled in the art that various modifications may be made without departing from the broadest spirit and scope of the present invention as set forth in the following claims. The specification and drawings are accordingly to be regarded in an illustrative rather than restrictive sense.

What is claimed is:

1. A method, comprising:
    (a) coupling a computer terminal to a power supply through a docking arrangement, the docking arrangement including a protection circuit;
    (b) detecting a current supplied to the computing terminal;
    (c) when the current is greater than a predetermined value, decoupling the computer terminal from the power supply;
    (d) after step (c), recoupling the computer terminal to the power supply; and
    (e) performing steps (b), (c) and (d), wherein a time between subsequent performances of step (b) increases after each performance of step (e).

2. The method according to claim 1, further comprising:
    (f) delaying step (d) for a predetermined time after step (c).

3. The method according to claim 1, wherein the computing terminal is one of a portable barcode scanner, a PDA, a cell phone and a laptop.

4. The method according to claim 1, wherein the power supply is one of a battery and a line voltage.

5. The method according to claim 1, wherein the docking arrangement is a cradle.

6. The method according to claim 1, wherein the cradle includes a plurality of docking arrangements for receiving a plurality of computing terminals.

7. The method according to claim 2, wherein the predetermined time is one of 100 milliseconds ("ms"), 600 ms and 25 seconds.

8. A docking arrangement, comprising:
    a cradle for receiving a computing terminal;
    a power supply providing a current to the terminal;
    a protection circuit detecting a current supplied to the computing terminal when the terminal is coupled to the power supply via the cradle,
    wherein, when the current is greater than a predetermined value, the protection circuit decouples the terminal from the power supply, and
    wherein the protection circuit recouples the terminal to the power supply to periodically monitor the current after recoupling, wherein a time period between subsequent instances of recoupling and monitoring increases as the protection circuit continues to detect that the current is greater than the predetermined value.

9. The docking arrangement of claim 8, further comprising:
    an indicator indicating that the terminal has been decoupled from the power supply.

10. The docking arrangement of claim 8, wherein the protection circuit delays the recoupling the terminal to the power supply for a predetermined time after the terminal is decoupled.

11. The docking arrangement of claim 8, wherein the computing terminal is one of a portable barcode scanner, a PDA, a cell phone and a laptop.

12. The docking arrangement of claim 8, wherein the power supply is one of a battery and a line voltage.

13. The docking arrangement of claim 8, wherein the docking arrangement is a cradle.

14. The docking arrangement of claim 8, further comprising:
    a plurality of cradles for receiving a plurality of computing terminals.

15. The docking arrangement of claim 8, wherein the predetermined time is one of 100 milliseconds ("ms"), 600 ms and 25 seconds.

16. The docking arrangement of claim 9, wherein the indicator is one of a light-emitting diode and a speaker.

17. A system, comprising:
    a docking arrangement for coupling a power supply to a computing terminal, the power supply supplying power to the computing terminal; and
    a circuit detecting a current being supplied to the computing terminal,
    wherein, when the current is greater than a predetermined level, the circuit decoupling the power supply from the computing terminal for a predetermined time, wherein, after the decoupling, the circuit coupling the power supply to the computing terminal to monitor the current wherein the predetermined time increases as the circuit continues to detect that the current is greater than the predetermined level.

18. The system of claim 17, wherein the circuit delays the recoupling the terminal to the power supply for a predetermined time after the terminal is decoupled.

19. The system of claim 17, wherein the computing terminal is one of a portable barcode scanner, a PDA, a cell phone and a laptop.

20. The system of claim 17, wherein the power supply is one of a battery and a line voltage.

21. The system of claim 17, wherein the docking arrangement is a cradle.

22. The system of claim 17, wherein the docking arrangement further comprises:
    a plurality of cradles for receiving a plurality of computing terminals.

23. The system of claim 17, wherein the predetermined time is one of 100 milliseconds ("ms"), 600 ms and 25 seconds.

* * * * *